Patented Aug. 11, 1925.

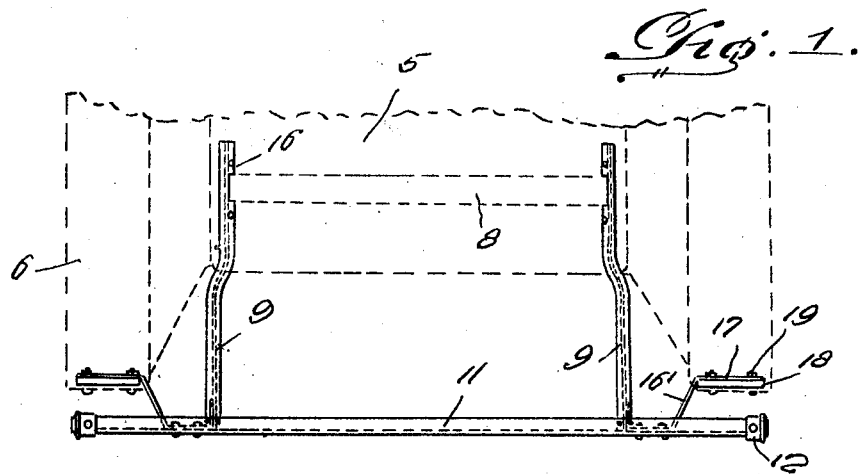
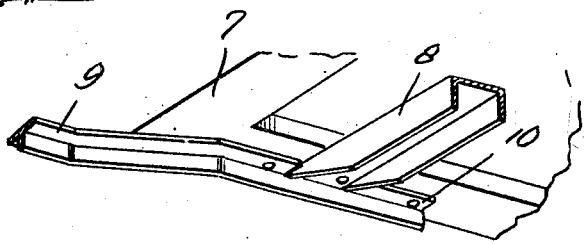
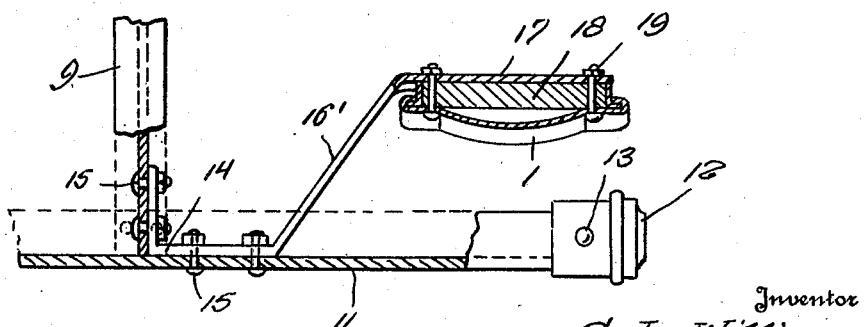

1,549,643

UNITED STATES PATENT OFFICE.

CLAUDE L. WILLIAMS, OF YATES CENTER, KANSAS.

COMBINATION FENDER BRACE AND BUMPER.

Application filed April 30, 1925. Serial No. 26,977.

*To all whom it may concern:*

Be it known that I, CLAUDE L. WILLIAMS, a citizen of the United States, residing at Yates Center, in the county of Woodson and State of Kansas, have invented certain new and useful Improvements in a Combination Fender Brace and Bumper, of which the following is a specification.

The present invention appertains to a combination fender brace and bumper, and has for one of its objects to provide a device of this nature, with a simple construction, and one which can be readily and easily attached to an automobile.

Another object of the invention is to provide a combination fender brace and bumper, which will serve to brace the fenders of the automobile, for preventing any vibration thereof and to provide a bumper member which will prevent the fenders from becoming injured, and at the same time to connect the two fenders together, wherein the fenders will be braced relative to the vehicle, and relative to each other.

With the above and numerous other objects in view, as will appear as the description proceeds, the invention resides in certain novel features of construction, and in the combination and arrangement of parts as will be hereinafter more fully described and claimed.

In the drawing:

Figure 1 is a plan view of my improved combination fender brace and bumper.

Figure 2 is a perspective view of a portion of the under side of the chassis of an automobile, showing a portion of the combination fender brace and bumper member secured thereto, and Figure 3 is a sectional view through one end of the combination fender brace and bumper and also through one fender of the automobile.

Referring to the drawing in detail, it will be seen that 5 designates generally an automobile body, in the present instance, an automobile of the Ford type being illustrated for the purpose of showing a practical embodiment of the invention. The body 5 includes the rear fender 6. The body 5 of the automobile rests on a chassis 7, in the usual manner. A cross brace 8, channel shaped in cross section, forms a part of the chassis. A pair of supporting and connecting members 9 are shown as formed of T-iron, in the drawing, but it will be understood that any suitable beam or angle iron may be used. The supporting and connecting members 9 are provided with notches 16, which are designed to permit the ends of the cross brace 8 to be partially received therein, when the combination fender brace and bumper is installed. These notches 16 are slightly broader than the cross brace 8, so that the members 9 may be adjusted to accommodate different sizes in the fender. It often happens that there is a variation of an inch or more in the sizes of the fenders and this adjustable feature is necessary. The members 9 are fixed, by means of bolts or other fastening elements to the chassis 7, as is indicated at 10. A bumper 11 is formed of angle iron and has polished caps 12 fixed to its ends as at 13. The bumper 11 is fixed to the free ends of the members 9 by angle brackets 14, attached to the members 9 and to the bumper by bolts 15 or other suitable fastening elements. The brackets 14 are provided with forwardly and outwardly disposed extensions 16′, which terminate in arms 17 disposed transversely of the automobile in substantial parallelism with the bumper 11. These plates 17 are positioned adjacent the fenders 6 as is illustrated to advantage in Figure 3. Wooden blocks 18 are disposed in the spaces between the flanges of the fenders and bolts 19 are extended through the fenders, through the blocks and through the plates, thus forming a secure assembly, which will not be affected by vibration and the like.

From the foregoing description, it will be seen that I have devised a combination fender brace and bumper, which may be manufactured at a relatively low cost, one which is easy to install and which will be attractive in appearance, strong, durable, and withstand the vibration, so that the parts will be secured together and properly braced. It is apparent that numerous changes in the details of construction and in the combination and arrangement of parts may be resorted to, without departing from the spirit of the invention and the scope of the appended claims.

Having thus described my invention, what I claim as new is:

1. In combination with an automobile body having a pair of fenders, combined supporting and connecting members fixed to the automobile body and extending rearwardly therefrom, a bumper secured to the free ends of said members, arms extending forwardly from the bumper and terminating in plates, wooden blocks filling the spaces between the flanges of the fenders, and bolts extending through the flanges and through the blocks and through the plates.

2. In combination with an automobile including fenders, a pair of combined supporting and connecting members fixed to the body of the automobile and extending rearwardly therefrom, a bumper, angle brackets attached to the free ends of the members and to the bumpers and provided with forwardly extending portions terminating in outwardly extending plates, wooden blocks filling the spaces between the flanges of the fenders and bolts extending through the fenders, blocks, and the plates.

In testimony whereof I affix my signature.

CLAUDE L. WILLIAMS.